United States Patent [19]

Freed

[11] Patent Number: 4,971,847

[45] Date of Patent: Nov. 20, 1990

[54] MULTILAYERED STRUCTURES

[75] Inventor: William T. Freed, Stockton, N.J.

[73] Assignee: Rohm and Haas Company, Philadelphia, Pa.

[21] Appl. No.: 360,625

[22] Filed: Jun. 2, 1989

[51] Int. Cl.$^5$ .............................................. B29D 22/00
[52] U.S. Cl. .................................... 428/36.7; 428/213; 428/411.1; 428/475.5; 428/480; 428/523; 428/524; 428/473.5; 525/343
[58] Field of Search ................. 428/473.5, 475.5, 480, 428/411.1, 428/412, 524, 523, 522, 213, 36.7; 525/343

[56] References Cited

U.S. PATENT DOCUMENTS

| | | | |
|---|---|---|---|
| 4,246,374 | 1/1981 | Kopchik | 525/330.5 |
| 4,379,874 | 4/1983 | Stoy | 525/94 |
| 4,420,589 | 12/1983 | Stoy | 525/94 |
| 4,609,592 | 9/1986 | Liu et al. | 428/473.5 |
| 4,727,117 | 2/1988 | Hallden-Abberton et al. | 525/343 |
| 4,728,549 | 3/1988 | Shimizu et al. | 428/412 |
| 4,743,479 | 5/1988 | Nakamura et al. | 428/35 |
| 4,792,488 | 12/1988 | Schirmer | 428/349 |
| 4,804,566 | 2/1989 | Paul et al. | 428/35 |

FOREIGN PATENT DOCUMENTS

| | | |
|---|---|---|
| 0170594 | 7/1985 | European Pat. Off. |
| 199633 | 10/1986 | European Pat. Off. |
| 024685 | 4/1987 | European Pat. Off. |
| 55-081156 | 6/1980 | Japan |
| 62-198434 | 9/1987 | Japan |
| 62-246728 | 10/1987 | Japan |
| 63-017022 | 1/1988 | Japan |
| 63-3242 | 2/1988 | Japan |
| 8805717 | 9/1988 | PCT Int'l Appl. |

OTHER PUBLICATIONS

Alger et al., Measurement of Oxygen Transport Parameters in Polymer Films Initially Saturated with Air—J. Appl. Poly. Sic., vol. 36, pp. 1501–1511.

Ottino and Shah Analysis of Transient Sorption and Permeation of Small Molecules in Multiphase Polymer Systems—Polymer Eng. Sci., vol. 24, pp. 153–162, (1982).

Packaging Digest, vol. 25, No. 8, p. 5, 1988.

Packaging Strategies, vol. 7, No. 3, (Feb. 1989).

*Primary Examiner*—Edith Buffalow
*Attorney, Agent, or Firm*—Terrence P. Strobaugh

[57] ABSTRACT

Multilayer structures of gas-permeable film or sheet alternating with, and adherent to, layers of poly(glutarimide) film or sheet, exhibit outstanding resistance to gas permeation.

18 Claims, No Drawings

MULTILAYERED STRUCTURES

FIELD OF THE INVENTION

This invention relates to multilayered structures and their use in sheet, film or containers.

BACKGROUND OF THE INVENTION

The packaging industry has long sought to develop plastic film, sheet, bottles, wrappings, and other containers which are impervious to oxygen to preserve materials contained therein. That industry has further sought to develop similar items resistant to the passage of carbon dioxide for use in maintaining the carbonation of carbonated beverages. Resistance to passage of water vapor is also important to the packaging industry.

The most useful polymers which exhibit very low values for oxygen permeability are poly(vinylidene chloride) and polymers containing vinyl alcohol, such as ethylene-vinyl alcohol copolymers containing less than about 50 mol percent ethylene units, or homopolymers of hydrolyzed poly(vinyl acetate) known as poly(vinyl alcohol).

Although both types of polymers are utilized in commerce, they have deficiencies which limit their broader use. Poly(vinylidene chloride) is thermally less stable than most polymers and is difficult to process; poly(vinyl alcohol)'s barrier properties are greatly affected by high relative humidity, and the ethylene-vinyl alcohol polymers are not optically clear. Further, the structural properites required for many applications are difficult to achieve with these polymers.

The packaging industry has also sought to prepare containers exhibiting enhanced service temperature for the hot-fill packaging of foods, sterilization prior to packaging, autoclaving to sterilize contents, and the like. Materials attractive for such heat-sensitive uses tend to have poor barrier properties.

It has been known for some time that if laminates are prepared of two or more polymers layers adequately adhered together, the polymer layer or layers having good barrier properties can effectively form a barrier.

The permeability parameter for the multilayered structures can be predicted by use of the following equation:

$$t\text{TOTAL}/P_{average} = t_1/P_1 + t_2/P_2 + T_3/P_3 + \cdots + T_n/P_n$$

where t is the thickness of each individual film, P the known permeability parameter for that polymer, $t_{total}$ is the thickness of the total composite structure, and $P_{average}$ is the actual permeability parameter of the composite structure.

This relationship holds only if the films have no defects and if the adhesion is acceptable. If thick tie-layers are required to bond the layer, the thickness and permeability of these tie layers must be included in the equation.

Thermally stable, clear polyglutarimide polymers with improved service temperature as taught by R. M. Kopchik in U.S. Pat. No. 4,246,374 (1981), and reduced polyglutarimide polymers as taught by M. P. Hallden-Abberton et al., U.S. Pat. No. 4,727,117 (1988) are herein incorporated by reference.

The art has described the preparation of composite structures of polyglutarimides with polycarbonates, and has described the general possibility of preparing barrier/non-barrier/barrier tri-layer laminates for packaging use. The art has not described the multilayer structures of this invention.

It is thus an object of the present invention to disclose a multilayer structure having outstanding barrier properties to oxygen comprising layers prepared from one or more polymers having certain desirable physical properties but inadequate gas barrier properties of their own, and a polyglutarimide which has moderately good barrier properties. Another object is to prepare such a barrier composite structure further having excellent optical properties, resistance to impact, and a service temperature sufficient for hot-fill and sterilization. Under appropriate conditions the structure is expected to be an effective barrier for carbon dioxide and water vapor. Also the structure would be an effective barrier against other gases.

Further objects and advantages will be apparent from the following description of the present invention.

SUMMARY OF THE INVENTION

I have discovered multilayer structures having excellent oxygen barrier properties and a process for improving the gas-barrier properties of polymers which are only moderately good gas barriers. The structure comprises a composite structure having three of more polymer layers adherent to one another, wherein at least two of the layers are of a moderately good gas-barrier polymer, and in between the gas-barrier polymer layers is a layer or layers of a relatively more permeable polymer.

The gas-barrier layers are preferably formed from a glutarimide polymer, and, more preferably, from an N(-lower alkyl)dimethylglutarimide.

The more permeable polymer or polymers layer or layers are non-heat-shrinkable polymers which may be chosen to contribute particularly desired physical properties to the composite structure. A preferred, more permeable polymer layer is one of poly(carbonate), and, more preferably, of bis-phenol-A polycarbonate.

Surprisingly, the multilayer structures of this invention exhibit a resistance to gas permeation that is superior to equivalent thicknesses of gas-barrier polymers that are not alternated with the more permeable polymer. That is, the permeability of the film is less than that predicted for $t_{total}/P_{average}$ from the equation 2, above.

Also within the scope of the present invention are films, sheets and containers prepared from these structures. The scope of the present invention also includes a process of protecting from oxygen or moisture a substance, such as food or beverage, whose properties are degraded by contact with such gases, by enclosing the substance with a film, sheet or sealable package prepared from the multilayered structures of the invention. The scope of the present invention further includes a process for maintaining an inert or carbon dioxide atmosphere, even under pressure, by enclosing the gas in an appropriate sealed container prepared from the present composite structures.

DETAILED DESCRIPTION

The term "mer" as used herein means a combination of elements which form a single repeating unit in a polymer. Thus the monomer ethylene ($C_2H_4$) $CH_2=CH_2$ becomes the mer ethylene ($-CH_2-CH_2-$) in polyethylene, even though the ethylenic double bond is no longer present in the polymer. The mer may be hypothetical, as in a vinyl alcohol mer present in hydrolyzed poly(vinyl acetate). More than one mer is present in a copolymer. Mers may be formed by post-reaction on a polymer, such as in a N-methyl dimethylglutarimide mer formed by the addition of methylamine to two neighboring mers of methyl methacrylate accompanied by the loss of two molecules of methanol.

The term "vinyl" as used herein means $CH_2=CH-$ and the term "vinylidene" as used herein means $CH_2=C<$, where the unsubstituted bond is satisfied by a group or groups which is not hydrogen.

By "polymers which are moderately good gas barriers", I mean those polymers which are poorer barriers than ethylene-vinyl alcohol copolymers in their dry state and the vinylidene chloride polymers known as Saran ® plastic resin. These polymers are known to be very good or excellent gas barriers. Preferably, the polymers which are moderately good gas barriers are those having an oxygen permeability of greater than about $3 \times 10^{13}$ $(cm^{3*}$ cm$)/(cm^{2*}$ cm Hg* sec$)$, more preferably greater than about $6 \times 10^{13}$ $(cm^{3*}$ cm$)/(cm^{2*}$ cm Hg* sec$)$.

The maximum oxygen permeability of the moderately good gas barrier polymers is preferably about $9 \times 10^{12}$ $(cm^{3*}$ cm$)/(cm^{2*}$ cm Hg* sec$)$, although it is expected that polymers having higher oxygen permeability will show similarly enhanced gas-barrier properties when used in the composite structures of the present invention. The preferred, moderately good gas-barrier polymer is a glutarimide polymer.

The units of oxygen permeability are (oxygen volume passing through the sample, in $cm^3$ × sample thickness, in cm$)/($sample surface area, in $cm^2$ × oxygen pressure differentials across the sample, in cm Hg × test time in seconds$)=(cm^{3*}$ cm$)/(cm^{2*}$ cm Hg* sec$)$.

In the present specification, the term "glutarimide polymer" refers broadly to the polymers containing the cyclic group or mer

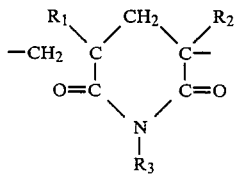

where $R_1$ and $R_2$ are hydrogen or lower alkyl, preferably both $R_1$ and $R_2$ are methyl, and $R_3$ is hydrogen, alkyl, aryl, alkaryl, or aralkyl. The term "lower alkyl" means alkyl groups having from 1 to 8 carbon atoms, and includes straight-chain, branched and cyclic alkyls such as methyl, ethyl, n-propyl, sec-propyl, n-butyl, isobutyl, propyls, hexyls including cyclohexyl, heptyls, octyls and the like. Substituents may be present on these groups, such as hydroxy, halogen, for example chloro, fluoro, and the like. Preferably $R_3$ is lower alkyl of 1 to 4 carbon atoms, and more preferably methyl.

The glutarimide group may be the sole repeating unit or mer in the polymer, or the polymer may contain other mers, preferably those of a lower alkyl (meth)acrylate, and, more preferably, methyl methacrylate. Other mers, such as those from styrene, vinyl chloride, (meth)acrylic acid, (meth)acrylic anhydride, (meth)acrylamides, such as methacrylamide, N-methyl methacrylamide, N,N-dimethyl methacrylamide, and the like, other (meth)acrylic esters, (meth)acrylonitrile, and the like may also be present. A preferred glutarimide polymer contains at least about 50% mers of glutarimide, and a more preferred glutarimide polymer contains at least about 80% mers of glutarimide.

The glutarimide polymer may be prepared by any of the methods known to those skilled in the art, such as by the reaction at elevated temperature of methacrylic acid-methacrylic ester copolymers with ammonia, an amine, urea, or a substituted urea, by reaction of poly(methacrylic anhydride) with ammonia or an amine, by thermal reaction of a methacrylic ester-methacrylamide copolymer to form the imide ring, or by reaction in solution or in the melt of a polymer containing a high proportion of (meth)acrylic ester groups with ammonia or an amine. Preferred is the method taught by R. M. Kopchik in U.S. Pat. No. 4,246,374.

The poly(glutarimide) may be post-treated to reduce or remove acid and/or anhydride groups according to the method taught by M. Hallden-Abberton et al. in U.S. Pat. No. 4,727,117; the reduced-acid polymers of that patent are preferred, but polyglutarimides containing acids and/or anhydrides are also useful in this invention.

The poly(glutarimide) may contain additives, such as lubricants, antioxidants, thermal stabiliziers, and the like. It may also contain low levels of inorganic fillers and/or fibers, such as mica, glass fibers, and the like.

The glutarimide polymer may also be blended with other polymers with which it is known to be miscible. U.S. Pat. No. 4,727,117 contains an extensive list of polymers with which such acid-reduced glutarimides may be blended which is hereby incorporated by reference.

Because of the relatively good gas-barrier properties of glutarimide polymers, addition of other, more permeable polymers, either as additional components in blends or as impact modifiers, may degrade the gas-barrier of the resulting material and require a greater overall thickness of the blended material to achieve the same barrier effect as the glutarimide polymer alone.

The relatively more permeable polymer is more permeable to gases than the particular gas-barrier polymer with which it alternates in the composite structure of the present invention. Each layer of the more permeable polymer may be a single polymer, a polymer blend or alloy, multiple layers of the same or different polymers, or may be the same as, or different from, other more permeable polymer layers in the composite structure.

The preferred more permeable polymers are selected from polycarbonates, such as those based on isopropylidene bis-phenol and sulfonyldiphenol; blends of polycarbonates with thermoplastic polyesters; the thermoplastic esters themselves, such as poly(ethylene terephthalate), poly(butylene terephthalate) and their blends and block copolymers; an aromatic resin such as poly(phenylene sulfide), poly(phenylene sulfone), poly(ester-ether-ketone) and the like; polyacetals; polyamides such as nylon 6, nylon 6.6, nylon 11 and the like, including both crystalline and amorphous nylons; poly(vinyl halides) such as poly(vinyl chloride); poly(acrylates) and poly(methacrylates) such as poly(methyl methacrylate) or poly(butyl acrylate); poly(styrene) including high-impact poly(styrene) and styrene comonomers with, for example, acrylonitrile or methyl methacrylate; polyolefins such as poly(propylene) and poly(ethylene). Any such polymer must be selected to be more permeable than the gas-barrier polymer. Particularly preferred as the more permeable polymer are poly(bis-phenol-A carbonate), poly(ethylene terephthalate), poly(vinyl chloride), polyethylene, polypropylene, nylon 6 and nylon 6,6. Especially preferred where a poly(glutarimide) is the gas-barrier polymer is poly(bis-phenol-A carbonate).

The structures of the present invention are formed from layers of film or sheet into a laminated, multi-layer structure in which the moderately good barrier polymer alternates with a more permeable polymer. The simplest structures of the present invention is a layer of the more permeable polymer sandwiched between two outer layers of moderately good barrier polymer. A more preferred structure MP/GB/MP/GB/MP (MP=more permeable; GB=gas barrier) adds an outside layer of a more permeable polymer over each of the outer moderately good barrier polymers. Such an alternation of barrier polymer and more permeable polymer may be repeated as often as is required or desired for a particular application. That is, the multilayer polymer structure may comprise three, five, seven or more layers.

Each layer of barrier polymer may be the same as, or different from, the other barrier polymer layers, and each of the more permeable layers may be the same as, or different from, other more permeable layers, so long as they are more permeable than the adjacent barrier layers. Further, each individual layer may be multiple layers of the same or similar polymer.

The multilayer structure of the present invention may be formed by co-extrusion of layers, by laminating together layers of pre-formed film or sheet, or by other known techniques for making laminated structures that will be readily apparent to those skilled in the art.

The layers of the structure are adherent to one another; they may adhere as a result of being co-extruded, of being glued together with a suitable type of adhesive, or of other adhesion processes. The adhesives and the other adhesion processes may be readily selected by those skilled in the art.

The layers of the structure are preferably continuous layers, and, more preferably, have a uniform thickness. That is, they do not have discontinuities, holes, thin spots and the like.

The preferred thickness of both the gas-barrier layer and the more permeable layer is in the range of from about 0.02 mm to about 10 mm. The layers may be of equal or different thickness. The adhesive, where used, is not considered a layer, unless it forms a continuous layer from about 0.02 to about 10 mm thick and is more permeable than the gas-barrier layer.

The structure may be biaxially oriented, uniaxially oriented or unoriented.

The uses to which such composite structures may be placed are many. Films may be used in the packaging of many foodstuffs, such as meat, snacks, boil-in-the-bag items such as frozen vegetables, and the like.

Containers suitable for the packaging of carbonated or oxygen-sensitive beverages, such as colas, ginger ale, fruit juice, and the like, may be prepared.

Containers suitable for hot-fill or sterilization may be molded from suitable injection-molded or extruded parisons. Such containers or bottles may be used for packaging of food such as condiments, ketchup, maple syrup, and the like. They may also be used for heat-sterilized containers, such as for medical uses, for example to hold intravenously administered fluids, and the like.

In the examples which follow, the polymers were tested using standard procedures which are summarized below. The results of the tests in the following examples are given as oxygen permeation, in units of oxygen volume passing through the sample, in $cm^3$/(sample surface area, in $cm^2$ oxygen pressure differential across the sample, in cm Hg $\times$ test time in seconds)=$(cm^3)/(cm^2 \cdot cm\ Hg \cdot sec)$. This differs from oxygen permeation, used earlier, by excluding the sample thickness. Temperature is 25° C. unless otherwise stated, and the term "RH" refers to relative humidity.

The following materials were used in the examples below. The bis(phenol-A) carbonate, referred to herein as PC, was a commercial, extrusion-grade material having a molecular weight of 24,600 and contains no lubricants. The glutarimide polymers were made according to the procedure of U.S. Pat. No. 4,275,374, by reacting poly(alkyl methacrylate) homopolymer or copolymer with amines or ammonia. The poly(N-methylglutarimide) is a commercial polymer made by reacting poly(methyl methacrylate) with methylamine. Poly(N-methylglutarimide) was further reacted to reduce the acid-anhydride functionality according to the procedure taught by U.S. Pat. No. 4,727,117. For both materials, the Vicat softening temperature given is related to the degree of imidization of the polymer.

Blends prepared for use in the examples were prepared by tumble-blending pellets, usually with added thermal stabilizer. The pellets were fed to a twin-screw, counter-rotating, intermeshing extruder 87 cm long, operating at a screw speed of about 100 rpm and equipped with a vacuum vent, a single- orifice, 6-mm strand die, a water bath or cooling the extruded strand and a strand pelletizer. The feed zones were set to 235° C. The melt temperature of the polymers was between 226° C. and 238° C.

Laminated film structures were prepared by either co-extrusion or by pressing together individual films at elevated temperatures. The individual films were formed using a single-screw, 25.4-mm-diameter extruder having a 24:1 length-to-diameter ratio and equipped with a two-stage vacuum vent, a 152.4-mm, adjustable-thickness film die, a three-roll, heated film stack immediately adjacent to the die lips for receiving the extruded film, and a film puller and winding apparatus. The film puller speed was set to avoid any drawdown of the film. The extruder was operated at a speed of 75 rpm; the melt temperatures were usually from about 232° C. to about 237° C., but were adjusted as necessary to achieve acceptable extrusion rates. The roll temperatures of the stack were, for the top and middle, 132° C., and for the bottom, 100° C. Films of 76 $\mu$m to 625 $\mu$m were prepared by this method.

The co-extrusion process was carried out using three single-screw of extruders equipped with Cloeren feed block and die. The extrusion temperatures were similar to those used in preparing the single films, but were adjusted to higher temperatures where necessary to achieve better adhesion.

The pressed, laminated structures were prepared by cutting the single films into squares approximately 100 by 100 mm; these were stacked against polished metal plates in a Carver press. The plates were held at a temperature of 271° C. For films having a thickness of approximately 2.5 mm, a template 2.5 by 100 by 100 mm was used, and film layers were stacked in this template. Contact pressure was applied for two minutes following mold closure, followed by one minute at 34,500 kPa. The sample and plates were removed from the press and allowed to cool in a cold press under contact pressure.

In those instances where a template was not used, the films were stacked as described above, but with a poly(ethylene terephthalate) film contacting the metal plate to serve as a release surface. In those examples where the film layers were bonded together with adhesive, a thin layer of hot-melt adhesive was applied using a commercial hot-melt applicator, the press temperature was set to 177° C. and the cycle was changed to one minute at contact pressure, one minute at 24,500 kPa, 45 seconds at 69,000 kPa, and two minutes at 138,000 kPa. The laminated film and plates were removed and allowed to cool in a cold press under contact pressure.

Oxygen permeation values were determined using a Mocon Ox-Tran 1000 tester, manufactured by Modern Controls Inc., Brooklyn Center Minnseota, U.S.A. Films for testing were prepared as 110 mm squares, sealed into the unit, and swept, with nitrogen on both sides of the film to determine a sample base line and allow the film to equilibrate with nitrogen. Pure oxygen at one atmosphere pressure was then swept over one face of the film for the duration of the test. The nitrogen swept over the opposite face of the film contained 1-2% hydrogen; this gas mixture was conducted from the test chamber through a CouloxT nickel-cadmium, fuel-cell detector where any oxygen present burned an equivalent amount of the excess hydrogen to generate an electric current proportional to the amount of oxygen. This current, automatically corrected for the sample baseline, was continuously recorded and used to calculate the oxygen permeation value of the sample.

The test conditions during both equilibration and oxygen testing were 23° C. and 0% relative humidity, unless otherwise noted.

The examples are intended to illustrate the present invention and not to limit it. All percentages are by weight unless otherwise specified and all reagents are of good commercial quality unless otherwise specified.

EXAMPLES 1-3

Polyglutarimide/Polycarbonate/Polyglutarimide Multilayer

These examples illustrate the preparation of a multilayer structure of a low-acid glutarimide(PG)//polycarbonate(PC)//low-acid glutarimide(PG) further containing protective outer layers of polycarbonate, and a comparison with a polycarbonate//low-acid glutarimide//polycarbonate structure. The low-acid glutarimide polymer was prepared as described in U.S. Pat. No. 4,246,374 and had a Vicat softening temperature of 160° C.

TABLE 1

| | Predicted and Measured Values for Multilayer Structures | | |
|---|---|---|---|
| | | Oxygen Permeation ($\times 10^{11}$ cm$^3$/(cm2 · cm Hg · sec)) | |
| Ex. No. | Composition and Thickness ($\mu$m) | Calculated | Experimental |
| 1 | PC//PG//PC, 520.7//622.3//774.7 | 5.66 | 5.90 |
| 2 | PC//PG//PC//PG//PC, 482.6//177.8//215.9//190.5//749.3 | 9.20 | 4.72 |
| 3 | PC//PG//PC//PG//PC, 381//317.5//177.8//279.4//571.5 | 5.90 | 0.71 |

In the above table, PC indicates the polycarbonate and PG indicates the glutarimide polymer.

The predicted values are calculated from the equation above. As may be seen from Table 1, the actual oxygen permeability of the sheets of Examples 2 and 3, in which the gas-barrier layer (PG) is divided into two individual layers alternating with the more permeable layers (PC), according to the present invention, is significantly lower than the permeability of the sheet of Example 1, in which the total barrier thickness is similar but the barrier layer is undivided.

EXAMPLE 4

PG/PC/PG-Pressed Film-Multilayer

This example illustrates that pressed films, as well as co-extruded films of polyglutarimide and polycarbonate exhibit unexpectedly improved oxygen barrier performance when the barrier film is applied to both sides of the more permeable material. Films of the glutarimide polymer and the polycarbonate from the same resins as used in Example 1 were separately extruded into films of nominal 150 $\mu$m thickness. The films were laminated as PG/PC/PG and pressed as described above. The film did not separate on handling. Barrier properties to oxygen were measured as in Example 1; thickness values were measured on the laminated film.

| | | oxygen permeation ($\times 10^{11}$ cm$^3$/(cm2 · cm Hg · sec)) | |
|---|---|---|---|
| Ex. No. | Composition and Thickness ($\mu$m) | Calculated | Experimental |
| 4 | PG//PC//PG, 101.6//177.8//101.6 | 1.75 | 1.46 |

EXAMPLES 5-8

This example presents data for permeability of oxygen in monolithic films for calculations for Examples 9-10. The polyglutarimide is an acid-reduced polymer having a Vicat softening point of about 160° C. and is similar to the polyglutarimide of Example 1.

The polycarbonate is the same as described in Example 1.

The poly(methyl methacrylate) is a homopolymer of molecular weight 150,000. It was processed into film on a 2.54 cm. single-screw Killion extruder equipped with a film die and pull rolls. Extruder speed was 62 rpm. The settings were feed 218° C., barrel 227° C., adaptor 218° C., die 224° C., and pull rolls 118° C. It is designated "PMMA".

The polypropylene is a commercial film; it is believed to be a homopolymer. It is designated "PP".

TABLE 2

| Measured Values for Monolithic Structures of Oxygen Permeation | | | |
|---|---|---|---|
| Ex. No. | Composition | Thickness, micrometers | Permeation ($\times 10^{12}$, cm$^3$/(cm$^2$ · cm Hg · sec) |
| 5 | PG | 206 | 4.52 |
| | | 185 | 4.20 |
| | | | (4.36) |
| 6 | PC | 228 | 167.5 |

TABLE 2-continued

Measured Values for Monolithic Structures of Oxygen Permeation

| Ex. No. | Composition | Thickness, micrometers | Permeation ($\times 10^{12}$, $cm^3/(cm^2 \cdot cm\ Hg \cdot sec)$) |
|---|---|---|---|
|  |  | 241 | 171.7 |
|  |  | 241 | 155.1 |
|  |  |  | (164.8) |
| 7 | PP | 317.5 | 89.5 |
|  |  | 304.8 | 89.6 |
|  |  | 317.5 | 93.8 |
|  |  | 304.8 | 87.7 |
|  |  |  | (90.1) |
| 8 | PMMA | 215.9 | 6.05 |
|  |  | 215.9 | 6.02 |
|  |  |  | (6.03) |

These examples demonstrate the improved and unexpected barrier performance against oxygen when the polyglutarimide is present in a three-layered structure on both sides of a polymer of lesser or somewhat equivalent permeability. Laminates were prepared and tested as described above. Samples were purged with nitrogen for ca. 350 hours, then conditioned with oxygen for about 450 hours before the test was completed.

TABLE 3

Measured and Predicted Values for Composite Structures

| Ex. No. | Composition and Thickness (μm) | Oxygen Permeation $\times 10^{10}$, $cm^3/(cm^2 \cdot cm\ Hg \cdot sec)$ | |
|---|---|---|---|
|  |  | Calculated | Measured |
| 9 | PG/PMMA/PG, 137/109/152 | 18.4 | 12.6 |
| 10 | PG/PP/PG, 165/759/185 | 17.4 | 12.5 |

EXAMPLE 11-15

These examples demonstrate the unexpected improvement in permeation when the polyglutarimide is layered on both sides of a polymer of poorer barrier performance to oxygen. Further multi-layer composites were prepared by co-extrusion as described in Example 1 from the polycarbonate and polyglutarimides used in Example 1. Thicknesses of the various layers were determined by cutting 5-8 micrometer sections with a glass knife from the co-extruded laminates at a point near where the sample for barrier measurements was taken. The thicknesses of the various layers were then determined by optical microscopy, using the difference in index of refraction to distinguish the various layers. An average of three measurements was used for the calculation of predicted barrier properties.

EXAMPLE 18

A laminate of two layers of the polyglutarimide of Example 2 surrounds a layer of poly(butyl acrylate) of approximately similar thickness. The poly(butyl acrylate) by itself is a poor barrier material, similar to polypropylene of Example 7. The laminate will exhibit better barrier properties of oxygen than will a monolithic layer of glutarimide of thickness equivalent to the sum of the two barrier layers used herein.

EXAMPLES 19-21

In a manner similar used to prepare the three- and five-multilayered structures disclosed above, four-, five-, six-layer and above structures may be prepared from alternating layers of polyglutarimide and polycarbonate.

I claim:

1. A multilayer structure comprising at least three polymer layers, at least two of which are layers of a moderately good gas-barrier polymer, the gas-barrier polymer layer alternating with a layer or layers of a relatively more permeable polymer, wherein the moderately good gas-barrier polymer is a glutarimide of the formula:

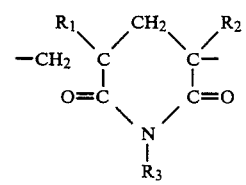

wherein $R_1$ and $R_2$ are hydrogen or lower alkyl and $R_3$ is hydrogen, alkyl, aryl, alkenyl or aralkyl and the more permeable polymer layer is selected from polycarbonate, a thermoplastic polyester, an aromatic resin, a polyacetal, a polyamide, polyvinylhalides, polyacrylates, polymethacrylates or polyolefins or blends thereof.

2. The structure of claim 1 wherein the glutarimide is N-(lower alkyl)dimethylglutarimide.

3. The structure of claim 2 wherein the polycarbonate is poly(bis-phenol-A carbonate).

4. The structure of claim 1 wherein the polyester is poly(ethylene terephthalate).

5. The structure of claim 1 wherein the polyester is poly(butylene terephthalate).

6. The structure of claim 1 wherein the polyolefin is polyethylene.

7. The structure of claim 1 wherein the polyolefin is polypropylene.

TABLE 4

| Ex. No. | Composition and Thickness (μm) | Oxygen Permeation $\times 10^{10}$, $cm^3/(cm^2 \cdot cm\ Hg \cdot sec)$ | |
|---|---|---|---|
|  |  | Calculated | Measured |
| 11* | PC/PG/PC, 154.9/139.7/127 | 42.3 | 41.7+/−6.1 |
| 12* | PC/PG/PC, 104.1/94.0/86.3 | 42.4 | 39.7+/−2.4 |
| 13* | PG (3 separate films) 114.3, 132, 137.2 |  | 14.7+/−0.45 |
| 14 | PC/PG/PC/PG/PC, 78.7/20.3/45.7/20/3/99 | 84.3 | 69.9+/−5.9 |
| 15 | PC/PG/PC/PG/PC, 152.4/30.5/78.7/35.6/134.6 | 84.7 | 68.9+/−4.7 |

*For comparison purposes only. They are outside the scope of this invention.

8. The structure of claim 1 wherein the polyamide is a nylon.

9. The structure of claim 8 wherein the nylon is nylon 6.

10. The structure of claim 8 wherein the nylon is nylon 6.6.

11. The structure of claim 1 wherein the layers are from about 0.02 mm to about 10 mm thick.

12. The structure of claim 1 wherein the structure is biaxially oriented.

13. The structure of claim 1 wherein the structure is uniaxially oriented.

14. The structure of claim 1 wherein the structure is unoriented.

15. A container prepared from the multilayered structure of claim 1.

16. The container of claim 15 in the form of a bottle.

17. A film prepared from the structure of claim 1.

18. A sheet prepared from the structure of claim 1.

* * * * *